July 6, 1948.　　　F. M. ORAIN　　　2,444,666
COUPLING DEVICE

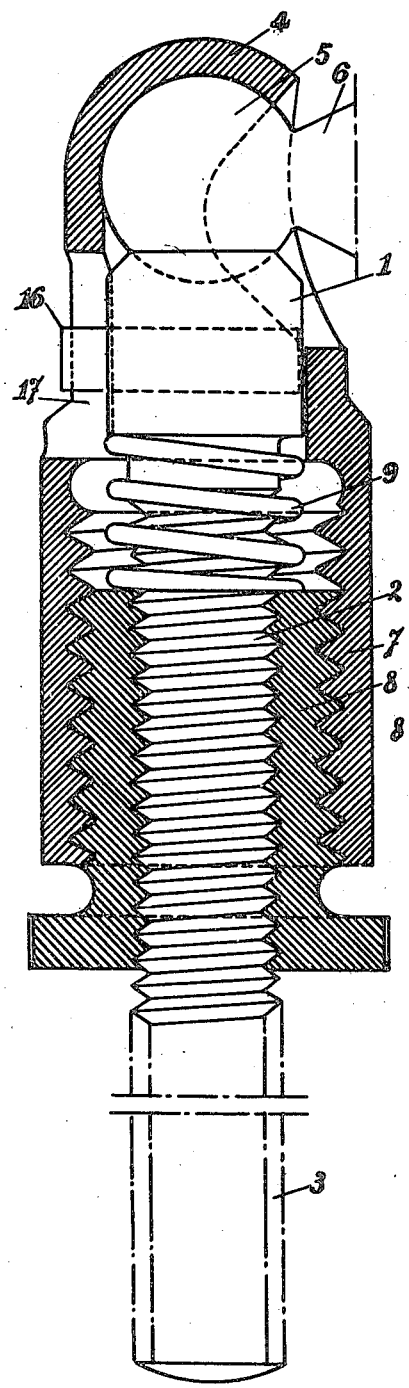
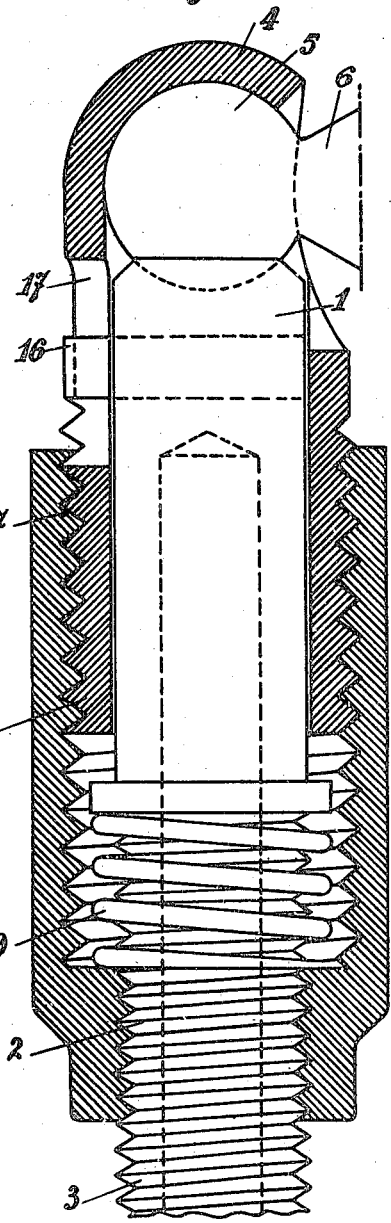

Filed Feb. 27, 1940　　　　　　　3 Sheets-Sheet 2

Inventor
Francois M. Orain
by Wilkinson & Mawhinney
Attorneys.

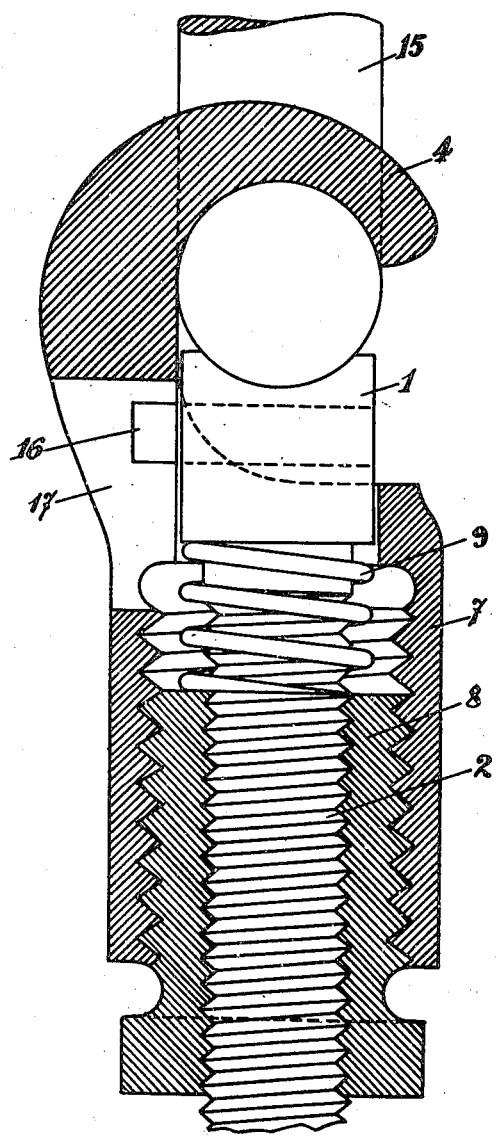

Patented July 6, 1948

2,444,666

UNITED STATES PATENT OFFICE 2,444,666

COUPLING DEVICE

François Marie Orain, Saint Cloud, France

Application February 27, 1940, Serial No. 321,105
In France March 3, 1939

Section 3, Public Law 690, August 8, 1946
Patent expires March 3, 1959

5 Claims. (Cl. 287—90)

The present invention relates to a device which enables any two mechanical elements to be coupled and uncoupled quickly and easily, said device furthermore offering great reliability inasmuch as it is absolutely impossible for any untimely uncoupling to occur by the effect, for example, of vibrations or of the stresses exerted on the coupled elements.

The coupling device according to the invention essentially comprises two clamping members, one of which is connected to one of the elements to be coupled, whereas the other element is removably clamped between these two clamping members which act like jaws, the movements of which together and apart are controlled by means of a control member on which the two aforesaid clamping members are screwed.

The longitudinal uncoupling movement of the two clamping members is effected against the longitudinal action of a spring which thus prevents any untimely uncoupling from taking place.

Preferably, the two clamping members are screwed on the control member, the two threads being of opposite pitch or of differential pitch, so that any movement of the control member causes a relative movement of the two clamping members.

Other features and peculiarities of the invention will become apparent from the ensuing description taken with reference to the accompanying drawings which show, diagrammatically and merely by way of example, various embodiments of the device according to the invention.

In said drawings:

Fig. 1 shows the application of the invention to the construction of a ball and socket joint for connecting two elements of a control rod.

Fig. 2 shows this same application according to a modification of construction.

Fig. 5 shows the application of the invention to the connection of a chain link to another member.

Figure 3:
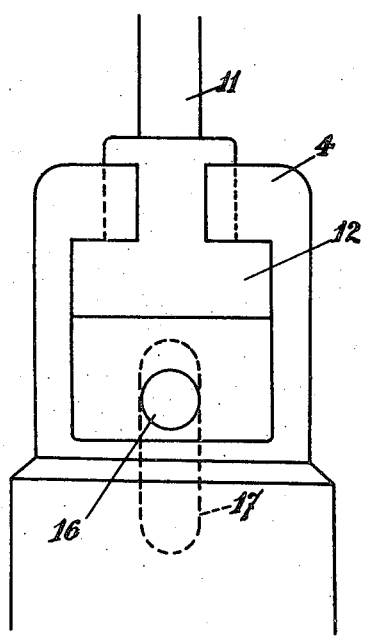
Figs. 3 and 4 show the application of the invention to the connection of an end of a cable to any member.

The coupling device according to the invention, shown in Fig. 1, enables a ball and socket connection to be obtained. Said device essentially comprises a first clamping member 1 mounted at the end of a threaded rod 2 on the lower part 3 of which is mounted one of the two elements to be coupled. This element, which may for example be a control rod, has not been shown. The device comprises a second clamping member 4 which co-operates with the first member 1 to clamp the spherical head 5 of the ball joint proper 6 which is connected to the second element to be coupled to the aforesaid control rod. This second clamping member 4 is rigidly secured to a sleeve 7. The threaded rod 2 and the sleeve 7, which are respectively rigidly secured to the two clamping members 1 and 4, are both screwed on a third member or control member 8; a pin 16, mounted on the member 1 and engaged in a longitudinal groove 17 of the sleeve 7, prevents any relative angular movement of the rod 2 and of said sleeve. In the case shown, the two threads are of opposite pitch. In this case it will be immediately understood that when the control member 8 is rotated, it causes the clamping members 1 and 4 to move towards or way from each other, thereby enabling the two elements, which are respectively secured to the rod 2 and to the ball 6, to be coupled or uncoupled. A spring 9 is interposed between the first clamping member 1 and the upper face of the control member 8. According to the invention, said spring 9 is compressed when the members 1 and 4 move apart. Said spring consequently has a tendency to prevent any separating movement and even to cause the two members 1 and 4 to move towards each other. For example, when by the effect of vibrations, the control member 8 tends to rotate, it can only do so in the direction in which it causes the two members to move towards each other, a fact which, amongst other advantages, enables the play that may have occurred to be eliminated. The coupling device thus offers great reliability.

It is not absolutely essential for the threads of the control member 8 to be of opposite pitch. Said threads could be of differential pitch; the thread of the sleeve 7 could even be equal to zero. The essential thing is that the pitch of the thread of the rod 2 is always sufficient for ensuring that the spring 9 is always compressed when the separating movement of the members 1 and 4 occurs.

In the modification of Fig. 2, the same elements are shown; the only difference lies in the fact that the control member, instead of being interposed between the threaded rod 2 and the sleeve 7, is arranged on the outside; the operation is absolutely the same.

Of course, the most varied modifications may be made in the device according to the invention, according to the applications considered.

Figure 4:
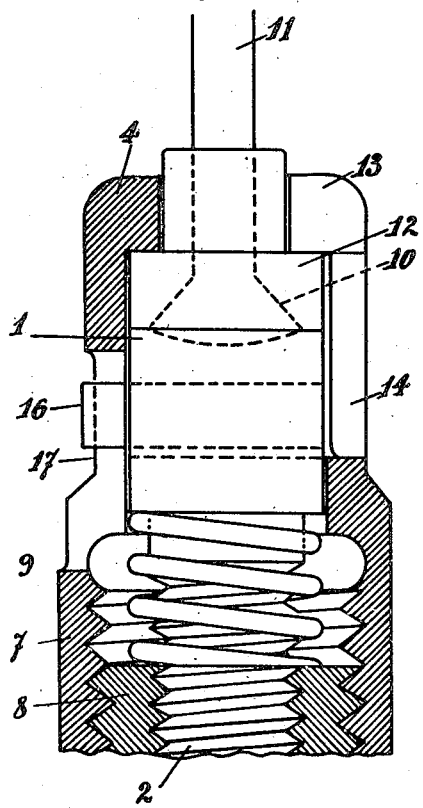

Thus, in Figs. 3 and 4, it has been assumed that the coupling device according to the invention enables the end 10 of a cable 11 to be connected to any member, not shown, which is secured to the rod 2. As usual, the end 10 of said cable 11 is secured, for example by rivetting and welding, to a terminal washer 12. In this case, it is said washer 12 that has to be clamped between the two clamping members 1 and 4 of the coupling device, instead of the spherical head 5 of the embodiments of Figs. 1 and 2. The members 1 and 4 are in this case shaped accordingly.

Furthermore, the member 4 is provided with appropriate grooves 13 and 14 in order to enable the terminal washer 12 to be mounted. All the other parts of the coupling device have not undergone any modification.

In Fig. 5, it has been assumed that the device according to the invention enables the link 15 of a chain to be connected to any member, not shown. In this case, the clamping member 4 is shaped like a hook so as to enable it to be mounted on said link 15 which is then finally clamped between said member 4 and the member 1 under the same conditions as the head 5 of Fig. 1 or the washer 12 of Fig. 4.

It is moreover understood that these various applications have only been given by way of example and that the invention is applicable under the same conditions and with the same advantages, every time it is required to connect two mechanical elements together, removably or permanently, both in the case in which such elements are to have a certain freedom of movement with respect to each other, and in the case in which all freedom of movement is to be prevented.

It is moreover obvious that the invention has only been described and illustrated in an explanatory and in no way limitative manner and that modifications of detail may be made therein without altering its spirit.

I claim:

1. A coupling device for coupling two mechanical elements, which comprises two co-operating clamping members, one of the elements to be coupled being connected to one of said members, whereas the other element is adapted to be clamped removably between said two clamping members, a threaded rod secured to one of said members, a threaded sleeve secured to the other member, means for preventing relative angular movement between said rod and said sleeve, a threaded control member adapted to co-operate with the threads of said rod and said sleeve to impart to these latter a relative longitudinal movement in either direction and consequently cause said clamping members to move towards and away from each other, and resilient means interposed between said clamping member secured to said rod and the upper face of said control member, whereby said elements can be reliably, readily and quickly coupled and uncoupled.

2. A coupling device for coupling two mechanical elements, which comprises two co-operating clamping members, one of the elements to be coupled being connected to one of said members, whereas the other element is adapted to be clamped removably between said two clamping members, a threaded rod secured to one of said members, an internally threaded sleeve secured to the other member, means for preventing relative angular movement between said rod and said sleeve, an internally and externally threaded control member adapted to co-operate with the threads of said rod and of said sleeve to impart to these latter a relative longitudinal movement in either direction and consequently cause said clamping members to move towards and away from each other, and resilient means interposed between said clamping member secured to said rod and the upper face of said control member, whereby said elements can be very reliably, readily and quickly coupled and uncoupled.

3. A coupling device for coupling two mechanical elements, which comprises two co-operating clamping members, one of the elements to be coupled being connected to one of said members, whereas the other element is adapted to be clamped removably between said two clamping members, a threaded rod secured to one of said members, an externally threaded sleeve secured to the other member, means for preventing relative angular movement between said rod and said sleeve, an internally threaded control member adapted to co-operate with the threads of said rod and of said sleeve to impart to these latter a relative longitudinal movement in either direction and consequently cause said clamping members to move towards and away from each other, and resilient means interposed between said clamping member secured to said rod and the upper face of said control member, whereby said elements can be very reliably, readily and quickly coupled and uncoupled.

4. A coupling device for coupling two mechanical elements, one of which is a cable, which comprises two co-operating clamping members, the other element to be coupled being connected to one of said members, a terminal member secured to said cable and adapted to be clamped removably between said two clamping members, a threaded rod secured to the other clamping member, an internally threaded sleeve secured to the first clamping member, means for preventing relative angular movement between said rod and said sleeve, an internally and externally threaded control member adapted to co-operate with the threads of said rod and of said sleeve to impart to these latter a relative longitudinal movement in either direction and consequently cause said clamping members to move towards and away from each other, and resilient means interposed between said clamping member secured to said rod and the upper face of said control member, whereby said cable can be very reliably, readily and quickly coupled to and uncoupled from the other member.

5. A coupling device for coupling two mechanical elements, one of which is a chain, which comprises two co-operating clamping members, the other element to be coupled being connected to one of said members, the other of said members being hook-shaped and adapted to engage the last link of the chain which is thus clamped removably between said two clamping members, a threaded rod secured to the first mentioned clamping member, an internally threaded sleeve secured to the other clamping member, means for preventing relative angular movement between said rod and said sleeve, an internally and externally threaded control member adapted to co-operate with the threads of said rod and of said sleeve to impart to these latter a relative longitudinal movement in either direction and consequently cause said clamping members to move towards and away from each other, and resilient means interposed between said clamping member secured to said rod and the upper face of said control member, whereby said chain can be very reliably, readily and quickly coupled to and uncoupled from the other member.

FRANÇOIS MARIE ORAIN.

REFERENCES CITED

The following references are of record in the file of this patent:

UNITED STATES PATENTS

| Number | Name | Date |
|---|---|---|
| 311,996 | Markham | Feb. 10, 1885 |
| 1,537,330 | Buckendale | May 12, 1925 |
| 1,550,672 | Breeze | Aug. 25, 1925 |
| 2,175,429 | Chayne | Oct. 10, 1939 |